Oct. 4, 1932.　　　　W. H. NOBLE　　　　1,881,092
MAGNETICALLY OPERATED COMPRESSOR REGULATOR
Original Filed July 31, 1930　　2 Sheets-Sheet 2
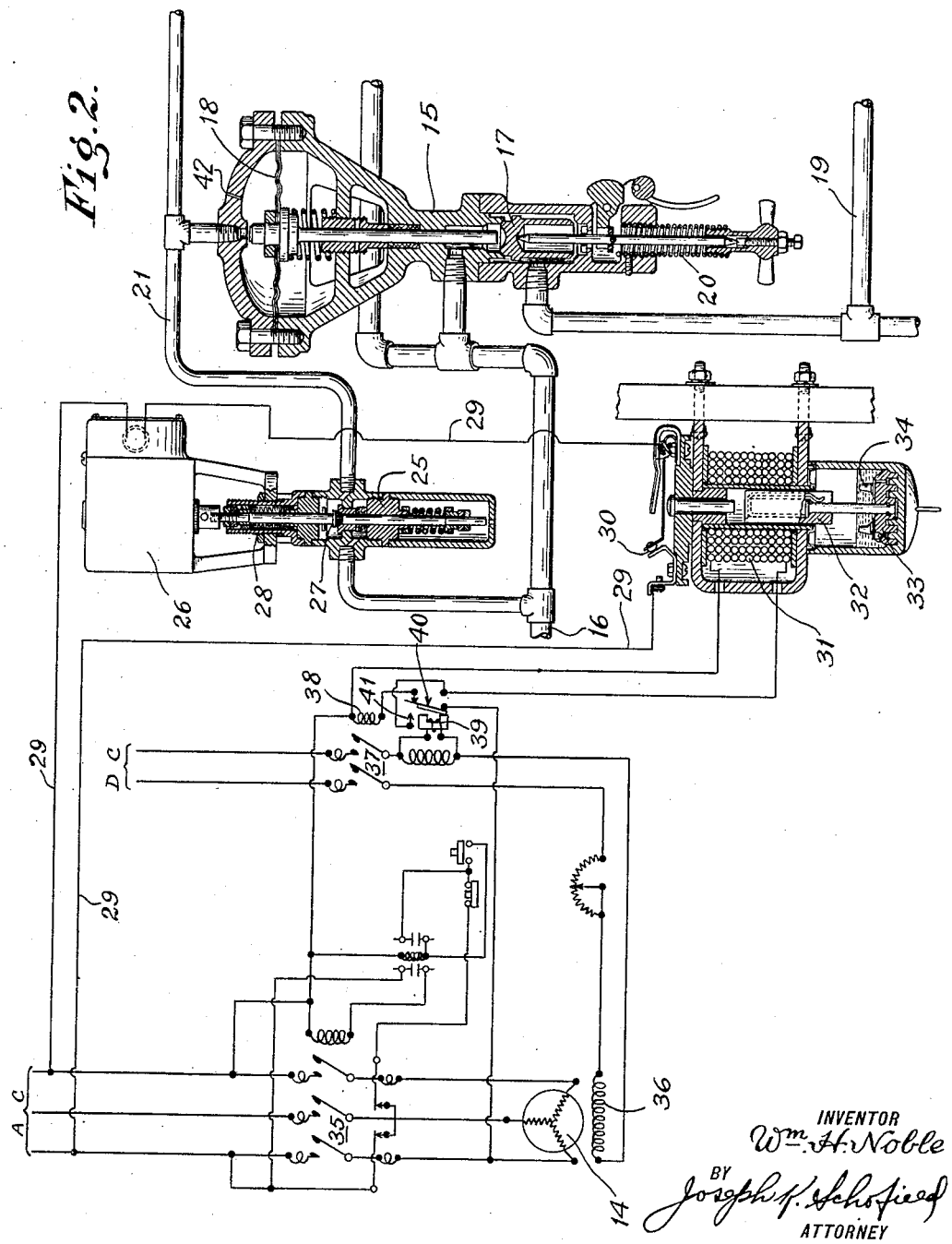

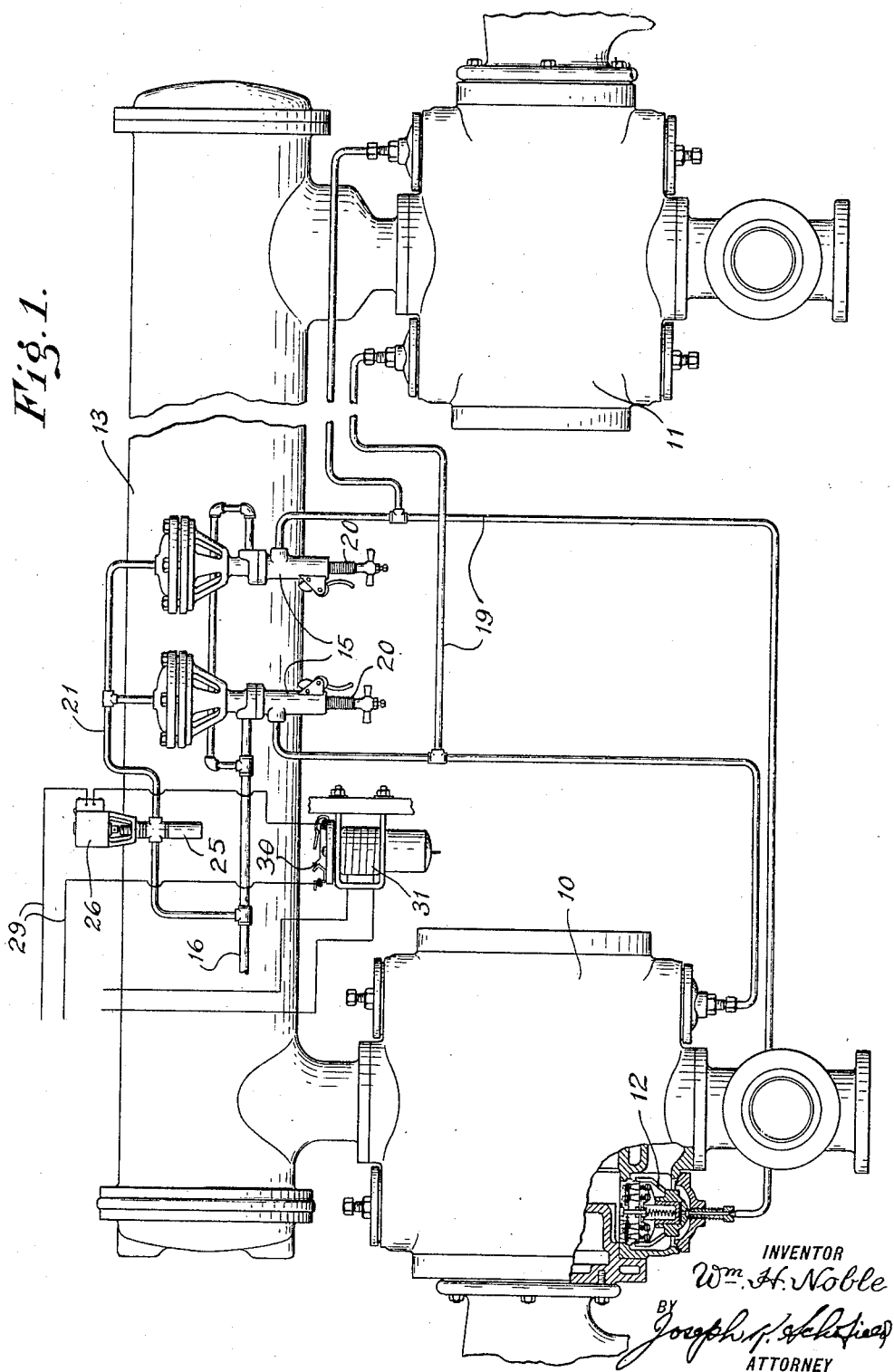

Patented Oct. 4, 1932

1,881,092

UNITED STATES PATENT OFFICE

WILLIAM H. NOBLE OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA

MAGNETICALLY OPERATED COMPRESSOR REGULATOR

Application filed July 31, 1930, Serial No. 471,980. Renewed November 4, 1931.

This invention relates to compressors and particularly to regulating or unloading means for a compressor driven by an electric motor.

An object of the invention is to provide an improved form of regulating or unloading mechanism for a compressor to maintain the compressor unloaded until the compressor and its motor have acquired normal speed and operation, the compressor being loaded as soon as this normal operation takes place.

In the operation of compressors by electric motors it is usual to employ motors of the synchronous type, the motor being first operated as an induction or other form of A. C. motor and, when the motor has acquired synchronous speed, a direct current is thrown upon the motor field to excite the motor so that it will operate as a standard form of synchronous motor.

A feature of importance of the present invention is that with a compressor driven by a synchronous motor the compressor may be maintained unloaded while the motor is running as an induction motor during the starting operation and prevent it from becoming loaded until after it has been running as a synchronous motor with direct current field excitation for a definite period.

Also whenever the motor speed for any reason falls below synchronous operation it is an object of the invention to provide means so that the compressor will become immediately unloaded, this unloaded operation of the compressor continuing until synchronous speed is again attained and the direct current field is again operating.

More particularly it is an object of the invention to provide compressor regulating means controlled by a switch held open until the motor has its D. C. field exciting circuit closed and is operating as a synchronous motor, this closing of the switch serving in turn to energize the coil of a solenoid which serves to open a switch in a pilot valve operating circuit so that the pilot valve will function to release the unloaders and allow the compressor to operate normally.

And finally it is an object of the invention to control compressor unloader mechanism by electric circuits including a circuit closed and opened respectively with the energizing and de-energizing of the D. C. field for the motor.

With these and other objects in view my invention includes the features of construction and operation set forth in the following specification and illustrated in the accompanying drawings.

In the accompanying drawings annexed hereto and forming a part of this specification, I have shown my invention embodied in a compound or two-stage compressor having step unloading means, but it will be understood that the invention can be otherwise embodied and that the drawings are not to be construed as defining or limiting the scope of the invention, the claims appended to this specification being relied upon for that purpose.

In the drawings:

Figure 1 is a side view in elevation of a two-stage compressor having the present invention applied hereto, the compressor cylinders being shown in a different plane to more clearly show connections to their valve mechanism, and Fig. 2 shows cross sectional views of the different unloader devices, and a diagrammatic view of the electric circuit together with the connections between the unloading devices.

In the above mentioned drawings I have shown but one specific embodiment of the invention which is now deemed preferable, but it is to be understood that changes and modifications may be made within the scope of the appended claims without departing from the spirit of the invention.

Efficient operation of compressors now requires close regulation of the receiver or discharge pressure delivered by the compressor, and, with electric motor drives for a compressor, the most usual and standard method of controlling the compressor to maintain the receiver pressure constant is to periodically unload the compressor. While thus unloaded the compressor and its motor operate idly, that is, without compressing more air or other fluid. A relatively small drop in the receiver pressure operates to cause the compressor to again be loaded and to start operating normally to supply additional fluid. In the present embodiment selected for illustration, a step controlling mechanism is illustrated so that as soon as the receiver pressure reaches a predetermined maximum one of the unloading mechanisms operates to unload a portion only of the compressor, a separate regulator valve being used, preferably set for a slightly higher pressure, to unload the remaining portion of the compressor should the receiver pressure continue to rise.

In the form of the invention illustrated, the two unloader valves are operated by a single pilot valve, the pilot valve being magnetically operated by a solenoid energized by a circuit from the main source of current for the compressor motor. With the circuit for this solenoid energized the pilot valve operates to admit fluid pressure to regulator valves or other form of unloader mechanism and unloads the compressor. This circuit for the pilot valve operating solenoid includes a magnetically operated switch moved to its open or inoperative position by a slowly moving armature of a solenoid when its coil is energized. So long as the compressor motor operates as an induction or other form of A. C. motor, the direct current circuit for the field is disconnected from the line and at this time the pilot valve operating circuit remains closed and its solenoid is energized. As soon, however, as a switch controlling the direct current circuit of the motor is closed the armature of the magnetically operated switch slowly rises and opens the switch in the pilot valve solenoid circuit. This causes the pilot valve to operate to load the compressor by de-energizing this solenoid circuit.

Referring more in detail to the figures of the drawings, I provide a low pressure cylinder 10 and a high pressure cylinder 11, each of which may, as shown, be provided with inlet valves 12 (but one being shown) adapted to be held in inoperative position to effect an unloading of the end of the cylinder in which it is mounted. As valves 12 of this type are old and well-known, it is not thought necessary that they be further described. Those shown in the drawings are or may be identical with those shown in the patent to Merwarth 1,741,426.

Between the discharge side of the low pressure cylinder 10 and the intake side of the high pressure cylinder 11 is an intercooler 13 of any usual or standard form. The compressor is operated by an electric motor 14 having its circuits indicated diagrammatically in Fig. 2. The motor 14 illustrated is of the synchronous type adapted to be operated during starting as an induction motor and, upon acquiring synchronous speed, may be switched over to a motor of the synchronous type by excitation of a direct current field. The circuits for this motor will presently be briefly described.

In order to operate the intake valves 12 to unload the ends of the cylinders 10 and 11 within which they are mounted when the receiver pressure exceeds a predetermined adjustable pressure, and also to hold the valves 12 in unloaded position during starting operations, I provide an unloader regulator 15, the one shown being similar to that described and claimed in the patent to Raymond 1,697,404. In order to effect step unloading enabling operation of the compressor at full, half and no load, two regulator valves 15 may be provided adjusted preferably for slightly different pressures so that when the compressor discharge exceeds its predetermined pressure one of the regulator valves 12 will operate to unload one end each of the low pressure and high pressure cylinders. The compressor may then continue to operate at half load or capacity until pressure continues to increase within the receiver when the second regulator 15 will operate to supply fluid to the unloader valves 12 at the opposite ends of the low and high pressure cylinders, thus completely unloading the compressor.

Referring to Fig. 2 of the drawings, one of the regulator valves 15 is shown in cross section and upon an enlarged scale. A pipe 16 is connected to the compressor receiver (not shown) and enters the body of the regulator above the valve 17. A branch 21 of pipe 16 enters the regulator above a diaphragm 18 and in pipe 21 is interposed a solenoid operated pilot valve 25. A spring 20 permits adjustment of the pressure necessary to be exerted against the valve 17 and thus regulates the pressure within the receiver at which the compressor will be partially unloaded. As the other regulator 15 operating unloaders at the opposite ends of the cylinders 10 and 11 is similar and is connected to similar valves 12 at opposite ends of the cylinders, further description will be unnecessary. As stated above, this second regulator valve 15 may be adjusted to operate only when the receiver pressure has increased slightly above the pressure for which the first regulator valve 15 has been adjusted to operate.

It is improved means to control the operation of these unloader regulator valves 15 during starting and when the compressor requires to be unloaded to relieve the motor of its load to which this invention particularly relates. These controlling means will now be described.

A pilot valve 25 operated by means of a solenoid is shown adapted, when its coil 26 is magnetized, to open a valve 27. With the valve 27 open fluid under pressure from the compressor receiver is admitted to the regulator valves 15 through pipe 21. So long as the coil 26 remains unenergized the valve 25 is maintained tightly closed as by means of a spring on the stem of valve 27, thus preventing admission of fluid pressure to the regulator valves. So long, therefore, as the solenoid 26 is de-energized and the valve 27 maintained closed the compressor operates under normal full load conditions. The electric circuit 29 for energizing this pilot valve operating coil 26 is directly connected across the A. C. line supplying electric current to the compressor motor and includes a magnetically operated switch 30. So long as this latter switch 30 remains closed and with current within the circuit 29, the coil 26 operating the pilot valve 25 is maintained energized and the regulator valves 15 are operated to unload the compressor. As soon, however, as the switch 30 is opened, by means presently to be described, the circuit 29 is thereby opened and the pilot valve solenoid 26 is de-energized. The pilot valve 27 therefore closes, as by spring pressure in the usual manner, and pressure is gradually exhausted from the unloader regulators preferably through a small leak port 42 provided within a portion of the regulator valves 15. The intake valves 12 thereupon will resume their operative positions.

Special means are provided whereby the magnetically operated switch 30 may have its opening materially delayed when current is supplied to its operating coil 31. For this purpose the armature 32 of this solenoid has attached to it a dash pot 33 with adjustable valves 34 thereon so that considerable force is required to start movement of the armature 32 and when moved the armature 32 is compelled to move slowly. This delay therefore prevents immediate opening of the switch 30 in the pilot valve circuit 29 and thus delays loading the compressor until after the motor 14 operating the compressor has been operating for a short period of time as a synchronous motor. Preferably the switch 30 is forced by light spring pressure toward its closed position.

Circuits are shown for the motor 14 operating the compressor, these being indicated in their simplest form, as the circuits themselves form no part of the present invention. The compressor motor 14 is represented as of the 3-phase alternating current type, which, upon starting, may be operated as an induction motor as soon as the main switch 35 is closed. This main switch 35 may be closed by any desired magnetically operated relay means or manually. The motor 14 is operable as a synchronous motor by supplying direct current to the field 36. This is accomplished when the synchronizing switch 37 is closed, as by means of a small contactor operating coil 38 adjacent the switch 37.

Closing of the switch 37 to apply the D. C. current to the field 36 also energizes an electromagnet 39 and draws its armature 40 against the core, thus making a contact with a fixed contact 41. This completes a circuit to the coil 31 to force the armature 32 upward opening the contacts of switch 30 in the circuit for the pilot valve 25. As the switch 37 is closed only when the D. C. current is supplied to the field 36, the solenoid coil 31 controlling the switch 30 is energized only when the D. C. current is energizing the field 36 and the motor is running synchronously. The coil of the solenoid 31 for opening the switch 30 in the pilot valve circuit 29 is energized only when armature 40 moves from the position shown to engage contact 41, which occurs as soon as the direct current excitation for the field 36 is in operation.

In operation, as the motor, after having its main switch 35 closed, comes up to normal speed its D. C. field is energized by operation of contactor relay 39 shown in Fig. 2. As soon as this contactor circuit is closed by movement of the armature 40 the circuit including the solenoid 31 operating the delayed or slowly moved armature 32 is energized. This energizing of the solenoid 31 causes movement of the armature 32 and separates the contacts of switch 30 in the pilot valve circuit 29. The pilot switch coil 26 is thereupon de-energized allowing the pilot valve 25 to close. Fluid within the unloader mechanism is then allowed to escape slowly through the usual leak port 42 and permit the valves to resume their normal position and operation.

If for any reason the D. C. field circuit is interrupted switch 40 moves to its open position and the circuit including the magnetically controlled switch 30 is opened allowing the armature 32 to drop suddenly. This causes the switch contacts 30 to close and energize the circuit to open the pilot valve 25. This opening of the pilot valve 25 opens the conduits supplying fluid to the unloaders, thus promptly unloading the compressor.

What I claim is:

1. A compressor regulator comprising in combination, a compressor cylinder, unloading means therefor, a motor driving said compressor, a pilot valve controlling operation of said unloading means, magnetic means to operate said pilot valve, and a circuit for energizing said magnetic means, said circuit including a switch controlled by a field circuit of said motor.

2. A compressor regulator comprising in combination, a compressor cylinder, unloading means therefor, a motor driving said compressor, a pilot valve controlling operation of said unloading means, magnetic means to operate said pilot valve, and a circuit including a delayed operating switch for energizing said magnetic means whereby said unloaders will not be operated for a period of time after said circuit is closed.

3. A compressor regulator comprising in combination, a compressor cylinder, unloading means therefor, a motor driving said compressor, a pilot valve controlling operation of said unloading means, magnetic means to operate said pilot valve, a circuit including a delayed operating switch for controlling said pilot valve operating circuit, and a second circuit energized when said motor is operating normally controlling the switch in said first circuit.

4. A compressor regulator comprising in combination, a compressor cylinder, unloading means therefor, a motor driving said compressor, a pilot valve controlling operation of said unloading means, magnetic means to operate said pilot valve, a circuit for energizing said magnetic means including a delayed operating switch, and a second circuit controlling said delayed operating switch.

5. A compressor regulator comprising in combination, a compressor cylinder, unloading means therefor, a motor driving said compressor, a pilot valve controlling operation of said unloading means, magnetic means to operate said pilot valve, a circuit including a delayed operating switch for energizing said magnetic means, and supplemental magnetic means for operating switch.

6. A compressor regulator comprising in combination, a compressor cylinder, unloading means therefor, a synchronous motor for driving said compressor, a pilot valve controlling operation of said unloading means, magnetic means to operate said pilot valve, and a circuit closed simultaneously with the energizing of the direct current field of the motor for operating the pilot valve operating circuit.

7. A compressor regulator comprising in combination, a compressor cylinder, unloading means therefor, a synchronous motor for driving said compressor, a pilot valve controlling operation of said unloading means, magnetic means to operate said pilot valve, a circuit closed simultaneously with the energizing of the direct current field of the motor for operating the pilot valve operating circuit, and means to delay the operation of said unloaders by said circuit.

8. A compressor regulator comprising in combination, a compressor cylinder, unloading means therefor, a synchronous motor for driving said compressor, a pilot valve controlling operation of said unloading means, magnetic means to operate said pilot valve, a circuit closed simultaneously with the energizing of the direct current field of the motor, a magnetically controlled switch operated by said circuit, and a circuit for said magnetic means including said switch whereby said magnetic means will be de-energized and said pilot valve closed when said first mentioned circuit is closed.

9. A compressor regulator comprising in combination, a compressor cylinder, unloading means therefor, a synchronous motor for driving said compressor, circuits to start said motor as an induction motor, a synchronizing switch therefor, and means to operate said unloading means by said synchronizing switch.

10. A compressor regulator comprising in combination, a compressor cylinder, unloading means therefor, a pilot valve controlling said unloading means, a synchronous motor for driving said compressor, circuits to start said motor as an induction motor, a synchronizing switch, and means to operate said pilot valve by movement of said synchronizing switch.

11. A compressor regulator comprising in combination, a compressor cylinder, unloading means therefor, an electric motor for driving said compressor, A. C. and D. C. field circuits therefor, means to start said motor with said A. C. field circuit, a synchronizing switch for throwing in said D. C. circuit, and a switch operated by opening and closing said D. C. circuit for controlling operation of said unloading means.

In testimony whereof, I hereto affix my signature.

WILLIAM H. NOBLE.